(12) United States Patent
Heintzman et al.

(10) Patent No.: US 7,330,110 B1
(45) Date of Patent: Feb. 12, 2008

(54) SYSTEM AND METHOD FOR PROVIDING WIRELESS COMMUNICATION DEVICE ACCESS TO DYNAMIC BUSINESS INFORMATION

(75) Inventors: Scott Brooks Heintzman, Plymouth, MN (US); Robert John Richards, Plymouth, MN (US); David Newell Sjolander, Mendota Heights, MN (US); Thomas Gerald Nalley, Maple Plain, MN (US); Carol Ruth Nissen, Shoreview, MN (US); Jeffrey Dean Heine, Minneapolis, MN (US); Timothy Kenneth Johnson, Hutchinson, MN (US); Michael Murphy, Buffalo, MN (US)

(73) Assignee: Carlson Companies, Inc., Minneapolis, MN (US)

( * ) Notice: Subject to any disclaimer, the term of this patent is extended or adjusted under 35 U.S.C. 154(b) by 1279 days.

(21) Appl. No.: 09/820,197

(22) Filed: Mar. 28, 2001

Related U.S. Application Data

(60) Provisional application No. 60/226,639, filed on Aug. 21, 2000.

(51) Int. Cl.
*G08B 1/08* (2006.01)
(52) U.S. Cl. .............. 340/539.1; 340/539.11; 340/506; 340/517; 340/521; 340/522; 340/3.1; 340/825.36; 340/825.49
(58) Field of Classification Search .......... 340/539.1, 340/539.11, 506, 507, 517, 521, 522, 524, 340/525, 3.1, 825.36, 825.49
See application file for complete search history.

(56) References Cited

U.S. PATENT DOCUMENTS

| | | | | |
|---|---|---|---|---|
| 5,371,781 | A | * | 12/1994 | Ardon .......................... 379/59 |
| 5,418,528 | A | | 5/1995 | Hosack et al. ......... 340/825.44 |
| 5,504,476 | A | | 4/1996 | Marrs et al. ........... 340/825.44 |
| 5,694,120 | A | | 12/1997 | Indekeu et al. ........ 340/825.44 |
| 5,705,995 | A | | 1/1998 | Laflin et al. ........... 340/825.44 |
| 5,838,252 | A | * | 11/1998 | Kikinis ..................... 340/7.21 |
| 6,035,352 | A | | 3/2000 | Alonso et al. ............... 710/100 |
| 6,965,313 | B1 | * | 11/2005 | Saylor et al. .......... 340/539.18 |

* cited by examiner

*Primary Examiner*—Daryl C Pope
(74) *Attorney, Agent, or Firm*—Schwegman, Lundberg & Woessner, P.A.

(57) ABSTRACT

Systems and methods for a user to receive dynamic business information on a wireless communication device via a wireless connection are presented. The wireless communication device can be a hand-held personal computer, a paging device, a wireless telephone, or other wireless communication device. Dynamic business information comprising subscription-based content that is tailored to an individual is delivered to the device. The systems and methods provide a mechanism for setting personalized thresholds for data items maintained by an application. These thresholds can then be used to enact an event (or alert) via the application when the threshold is met. For example, the alert can be an audible sound or a display of a message that appears on the wireless communication device. As a further example, the alert can comprise an e-mail received on the wireless communication device.

28 Claims, 17 Drawing Sheets

410 http://dev.knowledgenet3.carlson.com/staging/editMyIndicatorGlobal.cf...

Please select the currency type (local or US), the Business Indicator Panels to be displayed and the sort order (order panels are to appear) and then click Update.

UserID: u12hr14

| Indicator Panel | Show? | Local Currency? | Sort Order |
|---|---|---|---|
| Accounts Receivable | ☑ | ☑ | 6 |
| Alert Summary | ☐ | ☐ | |
| Denied RN - Cumulative Firm | ☑ | ☑ | 2 |
| Denied RN - Cumulative Soft | ☑ | ☑ | 3 |
| Denied RN - Firm - Yesterday | ☑ | ☑ | 4 |
| Key Indicators: Day - MTD | ☑ | ☑ | 1 |
| Property Information | ☑ | ☑ | 5 |

[Update]

Business Indicators - Microsoft Internet ...

AU SYDNEY

| AU SYDNEY |
| CA BEVERLY HILLS |
| CN HONG KONG |
| ID JAKARTA |
| IN MUMBAI |
| KK ALMATY |
| MY KUALA LUMPUR |
| SG SINGAPORE |
| TH BANGKOK |
| TH CHIANG MAI |
| TW TAIP |

WRS Firm Denied RN

| T - 8/10 | | | 2 |
| F - 8/11 | | | 2 |
| S - 8/12 | | | 2 |
| S - 8/13 | | | 1 |
| M - 8/14 | | | 1 |
| T - 8/15 | | | 1 |
| W - 8/16 | | | 1 |
| T - 8/17 | 1 | T - 8/17 | 1 |
| F - 8/18 | 1 | F - 8/18 | 1 |
| S - 8/19 | 1 | S - 8/19 | 0 |
| S - 8/20 | 1 | S - 8/20 | 0 |
| M - 8/21 | 1 | M - 8/21 | 0 |
| T - 8/22 | 1 | T - 8/22 | 0 |
| W - 8/23 | 1 | W - 8/23 | 0 |

| Business Indicator | 8/8/00 | MTD |
|---|---|---|
| Currency | N/A | N/A |
| Revenue / Available Rm | N/A | N/A |
| Average Daily Rate | N/A | N/A |
| Actual Room Revenue | N/A | N/A |
| Occupancy | N/A | N/A |
| WRS Firm Denials / Rm | N/A | N/A |

CLOSE

Please enter the business indicator alert ranges and click Update.

Show All Indicators

Property: US MN MPLS PLAZA
View: Key Indicators: Day - MTD

| Activate Alert Message | Panel | Business Indicator | Activate Trigger | Trigger Values Override Below | Exceeds | Default Below | Exceeds |
|---|---|---|---|---|---|---|---|
| ☐ | Key Indicators: Day - MTD | Actual Room Revenue | ☐ | | | 100 | 100 |
| ☐ | | Average Daily Rate | ☐ | | | 100 | 100 |
| ☐ | | Denials Per Room - WRS Firm | ☐ | | | 100 | 100 |
| ☐ | | Occupancy Percentage | ☐ | | | 100 | 100 |
| ☐ | | Revenue Per Available Room | ☐ | | | 100 | 100 |

Update

If you have Problems/Questions about KnowledgeNet, contact the Help Desk at:
Properties call 402-501-5010 or email OmahaHelpDesk@carlson.com
Corporate Staff call 800-599-0286 / 763-212-1390 or email CHWHelpDesk@carlson.com

FIG. 5C

| | HOTEL CALIFORNIA | | ▼ | ~702 |

| ◄ | HOTEL CALIFORNIA | ► | — 704 |
| ◄ | Denied RN - Firm - Yesterday | ► | — 706 |

| Date | Available | Denials | Status |
|---|---|---|---|
| F - Mar 23 | 138 | 0 | OPN |
| S - Mar 24 | 160 | 0 | OPN |
| S - Mar 25 | 468 | 0 | OPN |
| M - Mar 26 | 352 | 0 | OPN |
| T - Mar 27 | 90 | 0 | OPN |
| W - Mar 28 | 35 | 1 | OPN |
| T - Mar 29 | 316 | 1 | GTD |
| F - Mar 30 | 41 | 4 | MS4 |
| S - Mar 31 | 40 | 3 | NAO |
| S - Apr 01 | 40 | 2 | NAO |
| M - Apr 02 | 31 | 3 | NAO |
| T - Apr 03 | 140 | 3 | OPN |
| W - Apr 04 | 94 | 3 | OPN |
| T - Apr 05 | 324 | 3 | OPN |
| F - Apr 06 | 206 | 3 | OPN |

FIG. 7D

The following Trigger(s) occurred:

| Property | Indicator | Amount | Type |
|---|---|---|---|
| US CA HOTEL CALIFORNIA | Bucket 90+ | | Above Maximum |
| US CA HOTEL CALIFORNIA | Total Outstanding | | Above Maximum |
| US NE HOTEL NEW HAMPSHIRE | Bucket 30 | | Above Maximum |
| US NE HOTEL NEW HAMPSHIRE | Bucket 60 | | Above Maximum |
| US NE HOTEL NEW HAMPSHIRE | Bucket 90 | | Below Minimum |
| US NE HOTEL NEW HAMPSHIRE | Denied Room Nights - WRS Firm | | Above Maximum |
| US NE HOTEL NEW HAMPSHIRE | Denied Room Nights - WRS Firm | | Above Maximum |
| US NE HOTEL NEW HAMPSHIRE | Denied Room Nights - WRS Firm | | Above Maximum |
| US NE HOTEL NEW HAMPSHIRE | Revenue Per Available Room - Daily | | Above Maximum |
| US NE HOTEL NEW HAMPSHIRE | Revenue Per Available Room - MTD | | Above Maximum |
| US NE HOTEL NEW HAMPSHIRE | Total Outstanding | | Above Maximum |

FIG. 7H

SYSTEM AND METHOD FOR PROVIDING WIRELESS COMMUNICATION DEVICE ACCESS TO DYNAMIC BUSINESS INFORMATION

RELATED FILES

This application claims the benefit of U.S. Provisional Application No. 60/226,639, filed Aug. 21, 2000, which is hereby incorporated by reference herein for all purposes.

FIELD

The present invention relates generally to computerized information systems, and more particularly to distributing dynamic business information via wireless communication devices.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2000, 2001, Carlson Hospitality Corporation. All Rights Reserved.

BACKGROUND

The use of computer systems in all areas human life has resulted in an explosion in the amount of information that is produced, including both business-related and personal information. This has the benefit of enabling those with access to the information to make better-informed decisions and plans based on the information.

However, in order to access this information, it is often the case that the user must have access to the computer system via a workstation, or the information must be printed and delivered to the user. This can be difficult for a user that must spend time in many different areas, as they may not have access to a workstation. Furthermore, printed information can rapidly be rendered out-of-date, especially for those applications in which the underlying data changes often.

A further problem is that there is often so much information available via computerized systems that it is difficult for a user to filter through unnecessary information to get to desired information. Additionally, there is a desire by users of data to be "advised" when a particular data point or situation has changed significantly.

As a result of the foregoing problems, there is a need for the present invention.

SUMMARY

The above-mentioned shortcomings, disadvantages and problems are addressed by the present invention, which will be understood by reading and studying the following specification.

The varying embodiments of the invention provide systems and methods for a user to receive dynamic business information on a wireless communication device via a wireless connection. In some embodiments the dynamic business information is subscription-based content that is tailored to the individual using the device. In alternative embodiments, the device can be used by the individual to add/update information. The wireless communication device can be a hand-held personal computer, a paging device, a wireless telephone, or other wireless communication device, the invention is not limited to a particular device.

The varying embodiments of the invention provide an organization, and users within the organization, the ability to serve disparate sources of information to an appropriate audience. In addition, some embodiments of the invention provide a mechanism for setting personalized thresholds for data items maintained by an application. These thresholds can then be used to enact an event (or alert) via the application when the threshold is met. For example, the alert can be an audible sound or a display of a message that appears on the wireless communication device. As a further example, the alert can comprise an e-mail received on the wireless communication device.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

BRIEF DESCRIPTION OF THE DRAWINGS

FIG. 4B illustrates an exemplary screen image for specifying panels for selected applications and application elements.

FIGS. 5A-5C illustrates an exemplary user interface for personalizing a set of attributes of applications and application elements according to an embodiment of the invention;

FIGS. 7A-7G provide illustrations of user interfaces for various embodiments of the invention; and FIG. 7H is an illustration of an exemplary e-mail generated in some embodiments of the invention.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the present invention. The following detailed description is, therefore, not to be taken in a limiting sense.

In the Figures, the same reference number is used throughout to refer to an identical component which appears in multiple Figures. Signals and connections may be referred to by the same reference number or label, and the actual meaning will be clear from its use in the context of the description.

The detailed description is divided into multiple sections. In the first section the hardware and operating environment of different embodiments of the invention is described. In the second section, the software environment of varying embodiments of the invention is described. In the third section, a description of methods according to various embodiments is presented. In the final section, a conclusion is provided.

Hardware and Operating Environment Overview

The various embodiments of the invention described in detail below provide a wireless, portable information system that gives a user access to information. The system allows a user to subscribe to information and applications that are useful to the user. The set of information and applications available for subscription is referred to as Subscription Based Information (SBI). In some embodiments, the SBI comprises applications that a user has subscribed to, elements within the applications such as subcomponents of the application, and panels (i.e. screens) containing particular indicators or data elements of the application and application elements. In addition, a user can personalize attributes of the indicators, for example by setting thresholds, or trigger values, on the information. These thresholds can then be registered to generate triggers to alert the user when the threshold is crossed. The set of alerts are referred to as Event Based Alerts (EBAs). The process of registering thresholds is referred to as "Personalized Threshold Registration (PTR). Thus, the user can have access to desired information and can be alerted to important events related to the information wherever and whenever the user has specified. For example, a user may desire to know when business indicator thresholds are reached. By subscribing to the desired content, and setting personalized thresholds on the appropriate data, the user can be automatically notified when the threshold event occurs.

Figure 1:
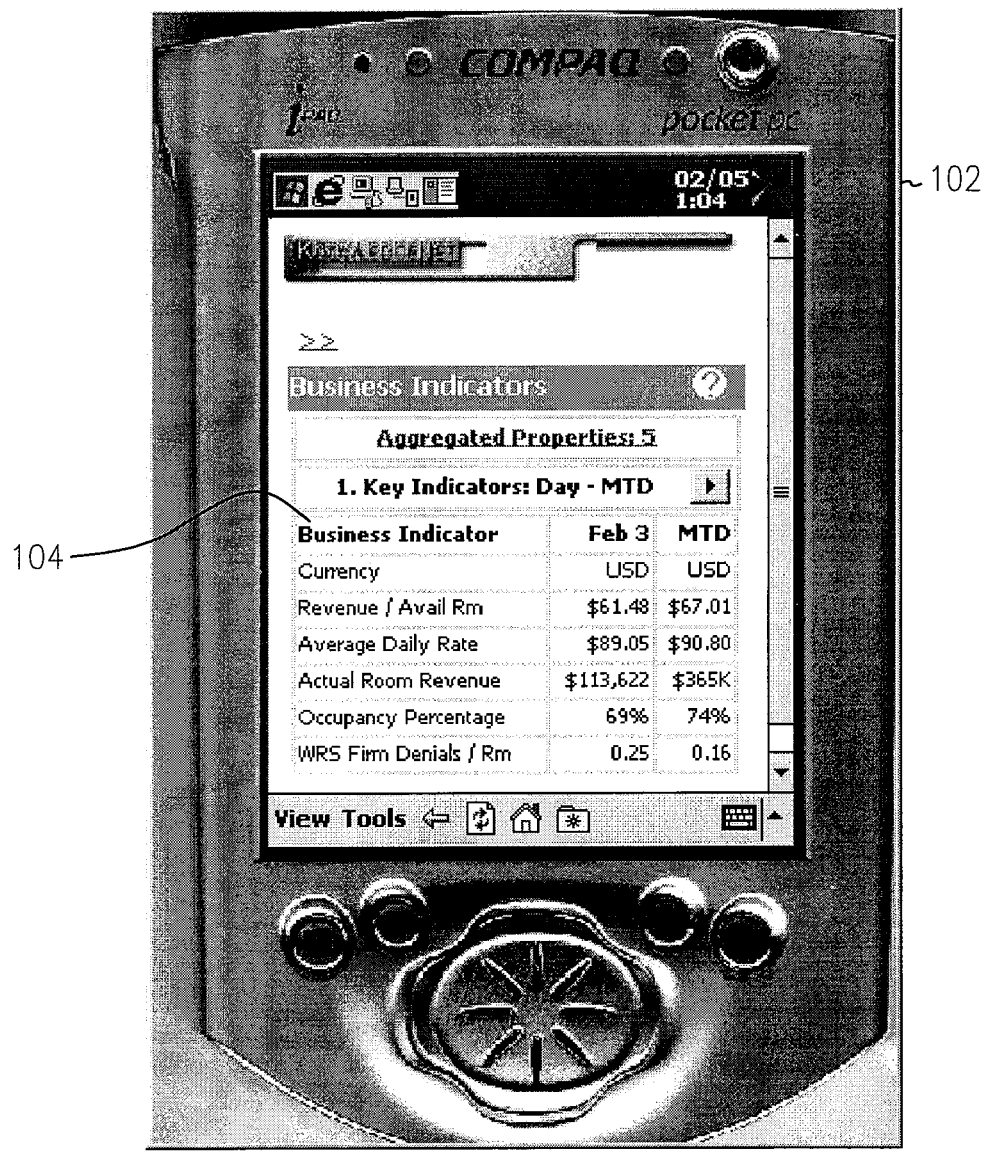
FIG. 1 is an illustration of a portable wireless device in which different embodiments of the invention can be practiced.

FIG. 1 provides an illustration of an exemplary embodiment of the invention on an exemplary wireless communication device 102. This description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer or a server computer. Generally, program modules include routines, programs, objects, components, data structures, etc., that perform particular tasks or implement particular abstract data types.

In the exemplary embodiment, device 102 is the iPAQ™ hand-held device from Compaq Corporation, however, the invention is not limited to any particular wireless communication device, or to wireless communication devices generally. As is known in the art, wireless communication devices such as device 102 include a processor, volatile memory (e.g. RAM) and non-volatile memory (e.g. ROM, PCMCIA cards, etc.) and input/output devices such as a display, buttons, switches, and in some embodiments, a keypad. Additionally, in some embodiments, the wireless communication device includes notification mechanisms such as an LED, a vibration device, or an audio generator. Furthermore, in some embodiments, device 102 comprises a wireless phone Typically wireless communication devices include a power supply implemented as batteries. In some embodiments, the batteries can be recharged by an external power source such as an AC adapter or a powered docking cradle.

Those skilled in the art will appreciate that the invention may be practiced with other computer system configurations, including multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

As illustrated in FIG. 1, the display of device, 102 shows a panel comprising an exemplary set of applications data 104 that a user has subscribed to. The data includes business information such as revenue per available room, the average daily rate for a room, the actual revenue generated by booked rooms, the occupancy percentage of the hotel or set of hotels, and denials of rooms on Worldwide Reservation Services (WRS). The fields illustrated are exemplary fields, the invention is not limited to any particular type of information.

The exemplary data elements shown in FIG. 1 that are subscribed to by a user cause alerts to be generated when the data values for the elements exceed threshold conditions. The alert can comprise highlighting the field. Examples of such highlighting include displaying a different background color, text color, blinking the text, or by placing an icon next to the element. In addition to display notification, the user can be alerted by a notification device such as an LED, a vibrating device on the wireless communication device, or an auditory indicator.

This section has presented an overview of various embodiments of the invention, the sections below provide further details regarding the systems and methods of the invention.

Software Environment

Figure 2:
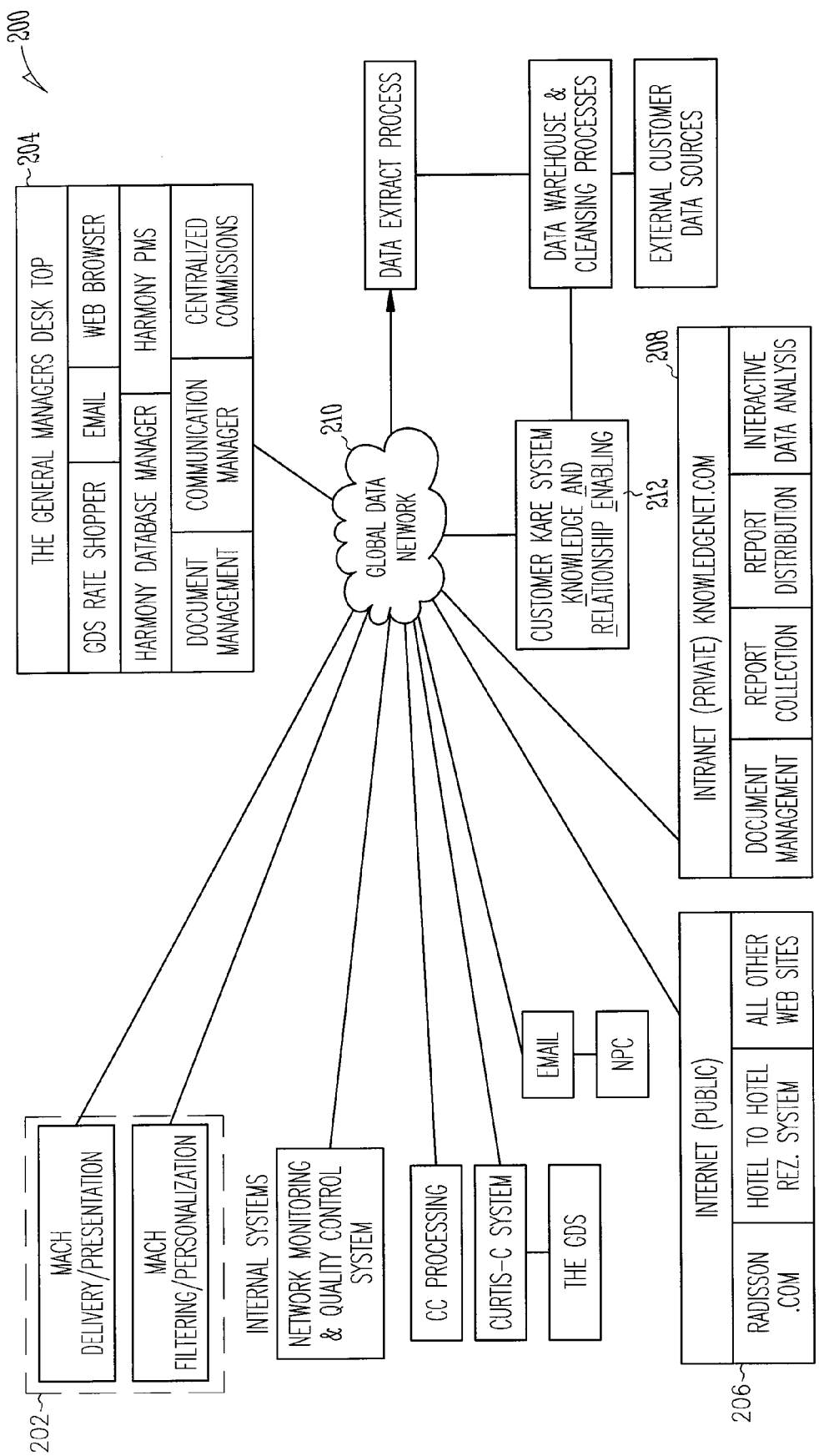
FIG. 2 is a diagram illustrating a system level overview of an exemplary embodiment of the invention.

The embodiments of the invention describe a software environment of systems and methods that provide a means for portable wireless communication devices to access dynamic business information. FIG. 2 is a block diagram describing the major components of such a system 200 according to an embodiment of the invention. As shown, system 200 includes subscription system 202, hotel management system 204, knowledge management system 208, publicly accessible systems 206 all connected via a network 210. Subscription system 202 operates to present data from varying combinations of applications 204, 206, 208, 210 and others to users having portable wireless communication devices. The combination of applications to be loaded to the wireless communication device can be selected by the user using a subscription process, and in addition, the Subscription Based Information (SBI) can be selected by the user. Thus, a user can subscribe to particular applications, application elements within applications, and panels comprising a set of indicators or data elements for the application and application elements.

In one embodiment of the invention, the subscription system 202 is a server computer running a version of the Microsoft Windows NT operating system. In alternative embodiments, a variant of the UNIX operating system is used. One embodiment of the system 202 is the MACH™ (Mobile Access to Carlson Hospitality) system from Carlson Hospitality Corporation. System 202 can also include a database for maintaining subscription information, attribute selection information (SBI), threshold information (PTR), and authentication information. In one embodiment of the invention, the Microsoft SQL Server database system is used. In an alternative embodiment, the Oracle database system is used. The invention is not limited to any particular database management system. In addition, in some embodiments of the invention, access to the database is via a middleware layer known in the art as ODBC (Open Database Connectivity).

Varying application programming software can be used to develop the system, as those of skill in the art will appreciate. In some embodiments, the software development systems used include the following:

Cognos PowerPlay®
Cognos Impromptu®
Allaire ColdFusion
Allaire Spectra®
Javascript®
C/C++
HTML The invention is not limited to any particular wireless communication device technology. In one embodiment, the wireless communication device comprises a Compaq iPAQ™ hand-held device running the Microsoft® Pocket PC (Windows CE 3.0) operating system, and includes applications such as ActiveSync®, Microsoft Pocket Internet Explorer, and AvantGo™ communications software.

The wireless communication device can communicate with network 210 using a variety of wired and wireless network interfaces, including, but not limited to:

Infrared
Serial
Cellular
Radio Frequency 802.11

In addition, the wireless communication device can communicate via a wireless modem, and can use the above technologies to participate in a Virtual Private Network (VPN)

This section has described the various software components in a system that provides dynamic business information and triggered alerts on a portable wireless communication device. As those of skill in the art will appreciate, the software can be written in any of a number of programming languages known in the art, including but not limited to C/C++, Visual Basic, Smalltalk, Pascal, Ada and similar programming languages. The invention is not limited to any particular programming language for implementation.

Methods

In the previous section, a system level overview of the operation of an exemplary embodiment of the invention was described. In this section, the particular methods of the invention performed by an operating environment executing an exemplary embodiment are described by reference to a flowchart shown in FIG. 3. The methods to be performed by the operating environment constitute computer programs made up of computer-executable instructions. Describing the methods by reference to a flowchart enables one skilled in the art to develop such programs including such instructions to carry out the methods on suitable computers (the processor of the computer executing the instructions from computer-readable media). The method illustrated in FIG. 3 is inclusive of the acts required to be taken by an operating environment executing an exemplary embodiment of the invention.

Figure 3:
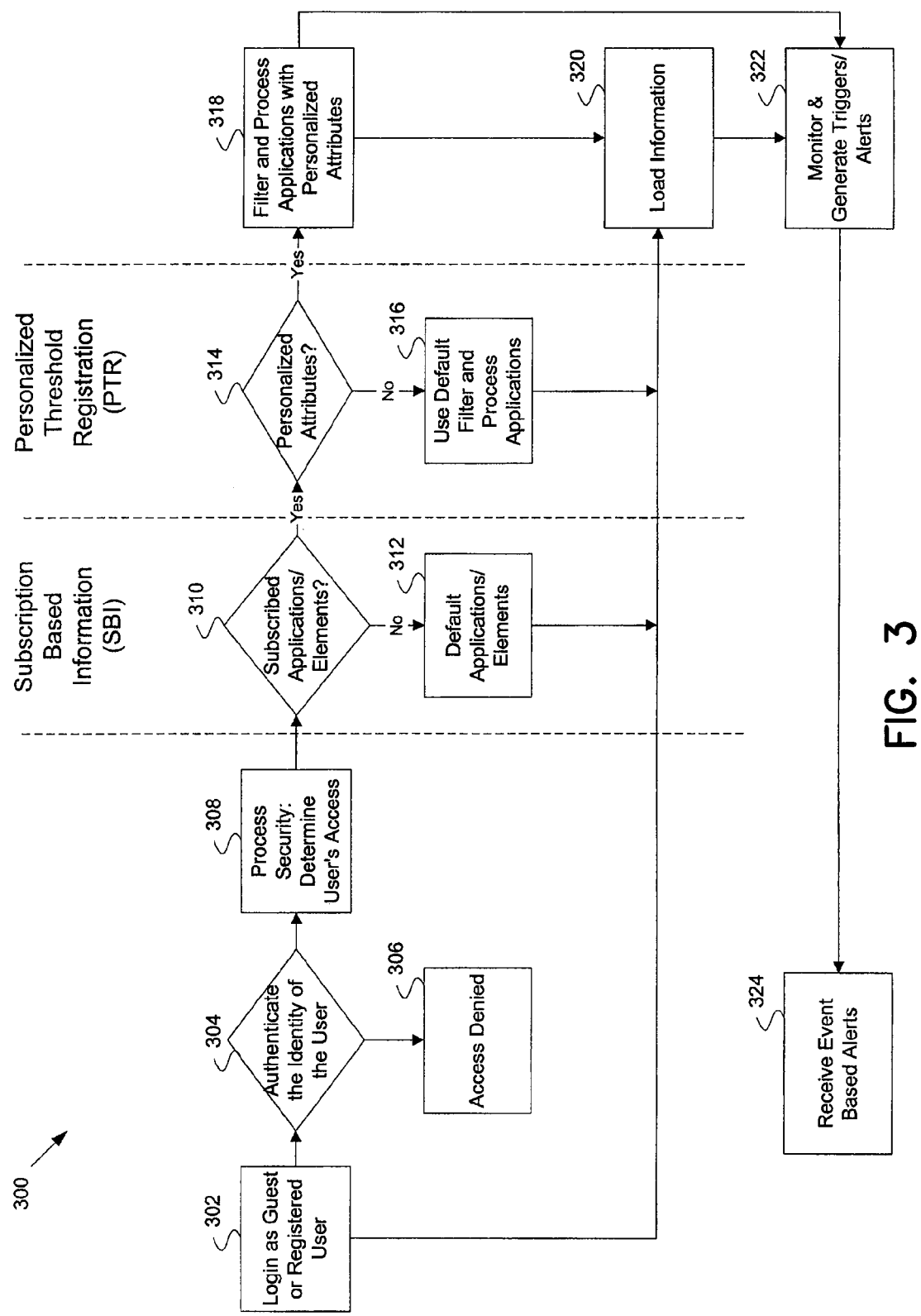
FIG. 3 is a flow diagram illustrating a method according to an exemplary embodiment of the invention.

An example iterative method 300 for providing dynamic business information to a portable wireless communication device according to implementation of the present invention is shown in FIG. 3. The method begins when a system executing the method provides a login mechanism (block 302). In one embodiment of the invention, at least two options are provided. In the first option, the user can login as a guest. In this case, the method proceeds directly to block 320 and bypasses the personalization components. The second option is to login as a registered user. In some embodiments of the invention, a registered user supplies a UserId (user identification) and a password. In alternative embodiments, registration is automatic.

Next, the UserId and password combination are authenticated against a controlled system that will either grant or deny access to the system (decision block 304). Such authentication systems are known in the art. If the UserId and password combination cannot be authenticated by the system, e.g. if an invalid or expired UserId and password combination are entered, system denies access to the user (block 306).

If the UserId and password combination can be authenticated, then the system proceeds to process the security options for the user (block 308). The security options can be used to determine the level of access granted to the applications and data provided by the system. In addition, the security options can determine a role for the user. In one embodiment of the invention, the security options are maintained in a database. In an alternative embodiment of the invention, the security options can be maintained by purchased software packages, such packages are known in the art. In a still further alternative embodiment, security options are maintained in a directory service. An example of such a service is the LDAP (Lightweight Directory Access Protocol) service. In further alternative embodiments, a combination of the above-described mechanisms are used to provide security options. The security elements are collected and stored with the session to determine what applications can be accessed and what elements within a given application can be accessed.

Figure 4A:
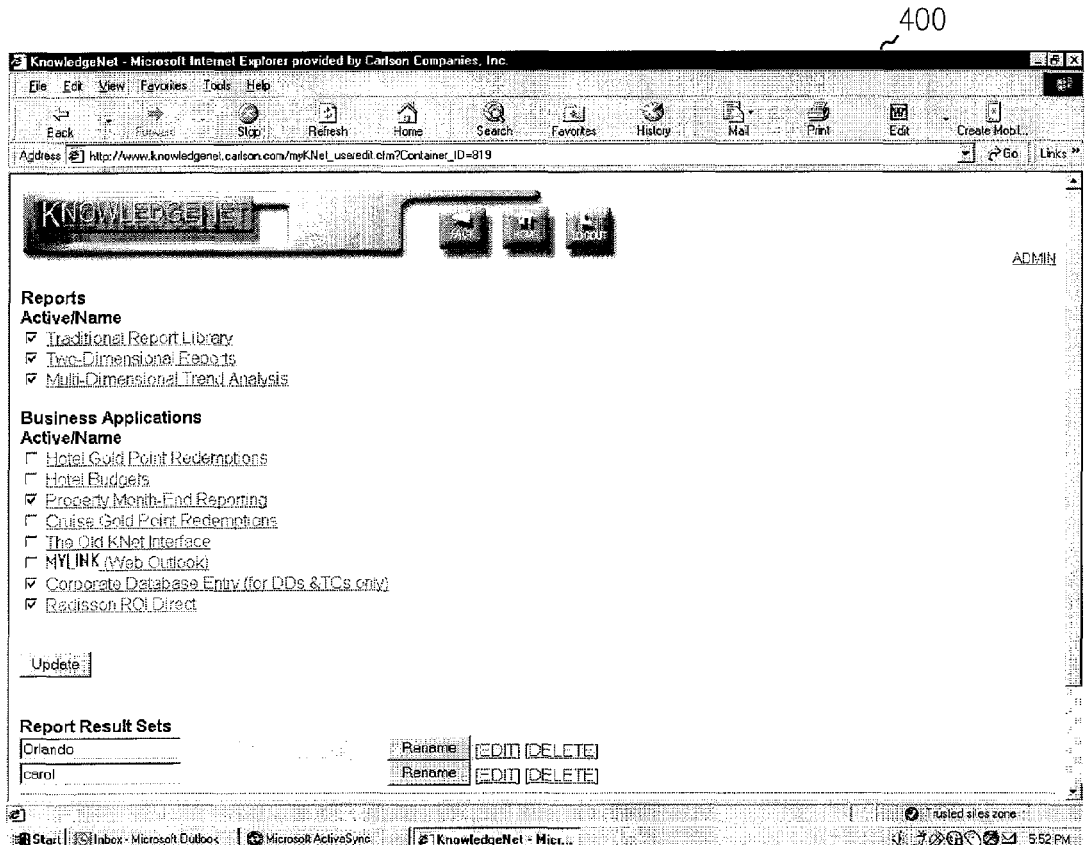
FIG. 4A illustrates an exemplary screen image for selecting a set of applications and application elements.

After security options are processed, the user's system will interrogate the subscription system 202 (FIG. 2) to determine which applications the user has subscribed to, that is, those applications that the user has chosen to be displayed (decision block 310). In one embodiment of the invention, the available applications include, but are not limited to:

Guest Profiles
Reservation Statistics
Reservation Status
Key Hotel Indicators
Productivity Indicators
Financial Receivables
Market Share
Guest Satisfaction
Key Corporate Indicators
Sales/Key Account Management FIG. 4A illustrates a screen image 400 of an exemplary set of applications and application elements chosen by the system based upon a particular user's credentials. A user can modify the set of subscribed applications, application elements, information and reports by removing or adding a check-mark next to the desired application, application element, information or report. As those of skill in the art will appreciate, alternative mechanisms for selecting applications, application elements, and reports are possible. For example, drop-down boxes could be used to select an application, set of information or report. Such alternative mechanisms are within the scope of the invention.

FIG. 4B illustrates an exemplary screen 410 for selecting from a set of panels containing indicators and/or data elements for a particular application or application element. The exemplary user interface provides a mechanism for a user to indicate whether or not a particular panel should be shown, how currency values are to be shown, and the order that the panels should be presented on the wireless communication device.

Returning to FIG. 3, if the user has not subscribed to any applications, the system, in one embodiment, presents all available applications and application elements to the user. In an alternative embodiment, the system presents a default set of applications and application elements to the user. The method then proceeds to block 320.

If the user has subscribed to a set of applications, the system then proceeds to determine the personalized attributes for the user (decision block 314). For each application that has been subscribed to, the application is interrogated to determine what thresholds have been set and activate the appropriate response/display.

Figure 5A:
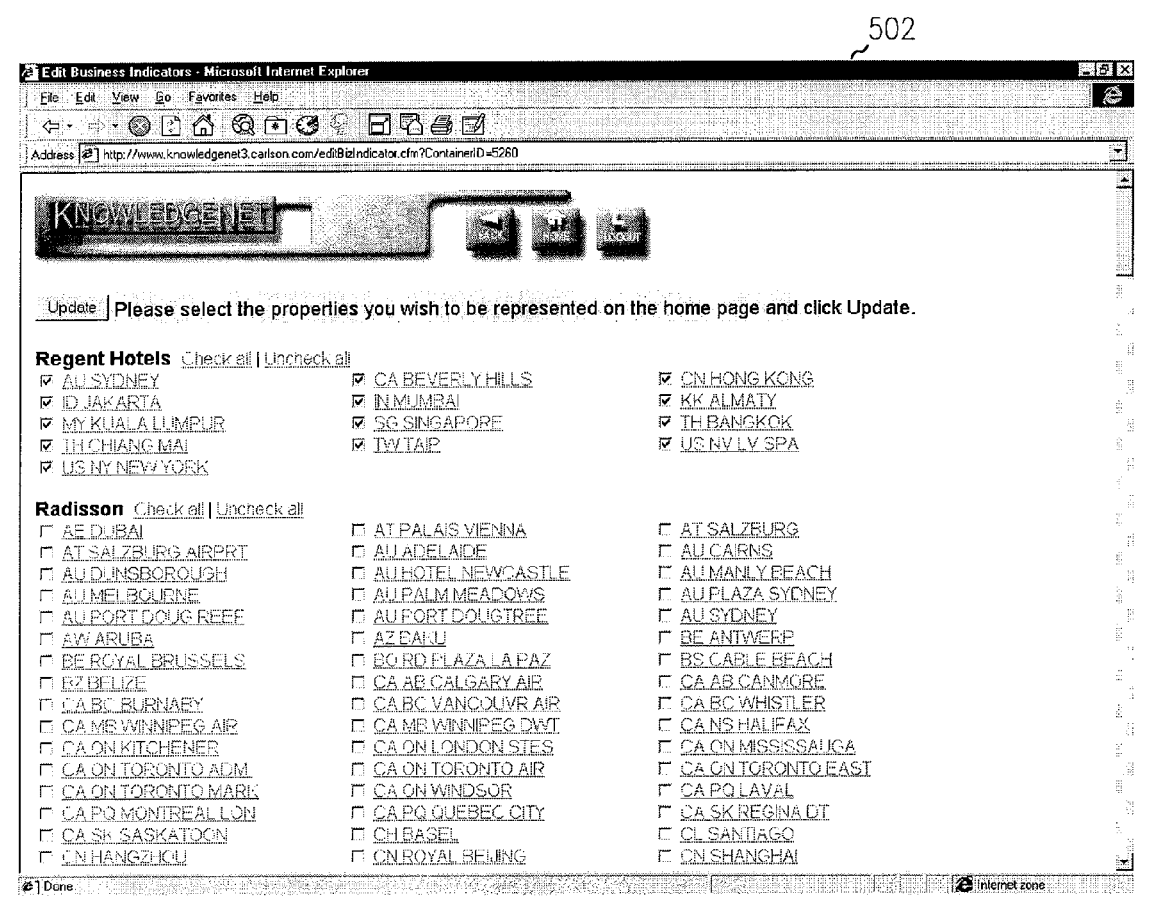

FIG. 5A illustrates an exemplary interface for selecting attributes that are to be displayed by the chosen application. The exemplary interface shows selecting specific hotels from a list of hotels. However, the invention is not limited to selection of hotels, and the concepts can be applied to other business environments. FIG. 5B provides an exemplary screen image that is displayed by the system, comprising only those items that were chosen in the exemplary interface shown in FIG. 5A. As noted above, alternative selection mechanisms can be used to select attributes, including radio buttons, drop-down boxes and the like. Such alternatives are within the scope of the invention.

The example illustrated in FIGS. 5A and 5B can be taken one step further. In addition to choosing which elements or attributes to track and trigger alerts, a user can also choose when they want to see these elements presented to them based upon threshold levels that are either not maintained or exceeded. FIG. 5C illustrates an exemplary screen where an individual can set thresholds (i.e. trigger values) on indicator data—thus allowing only relevant data to be displayed on this individuals display. Furthermore, the information can be triggered using the threshold information (i.e. the PTR) and in one embodiment of the invention, one or more alerts can be triggered. This provides an advantage by making the display not just data, but valuable information, because the user no longer has to filter through inordinate amounts of data to see that which the user is truly interested in.

Returning to FIG. 3, if the user has subscribed to particular applications, but does not select any attributes for the applications, the system filters and processes the applications (block 316). In some embodiments of the invention, the complete set of attributes for an application is presented to the user. In alternative embodiments, a default set of attributes (i.e. default SBI) is presented and a default set of PTR may be engaged.

If the user has selected attributes of an application, the system then proceeds to filter and process applications with personalized attributes (block 318). The system cycles through each application to which the user has subscribed, of which one was illustrated in FIGS. 5A-5C.

Next, the system loads information based on the user's authentication, application, application element, and panel subscriptions, and attribute personalization (block 320). Guest users can only have information loaded for publicly available applications, while authenticated users are processed as described above. Once each application has been processed it is presented in one of two manners.

1. Presentation is made on a computer with an Internet browser, or
2. Presentation is made on a wireless communication device Because it is possible that information will be sent to both types of devices, in some embodiments, the application presentation is developed with the expectation that it will be served on a wireless communication device. Thus the graphical user interface is built for the wireless communication device as a stand-alone, recognizable, and usable "puzzle" piece, i.e. a section of the display image.

Figure 6:
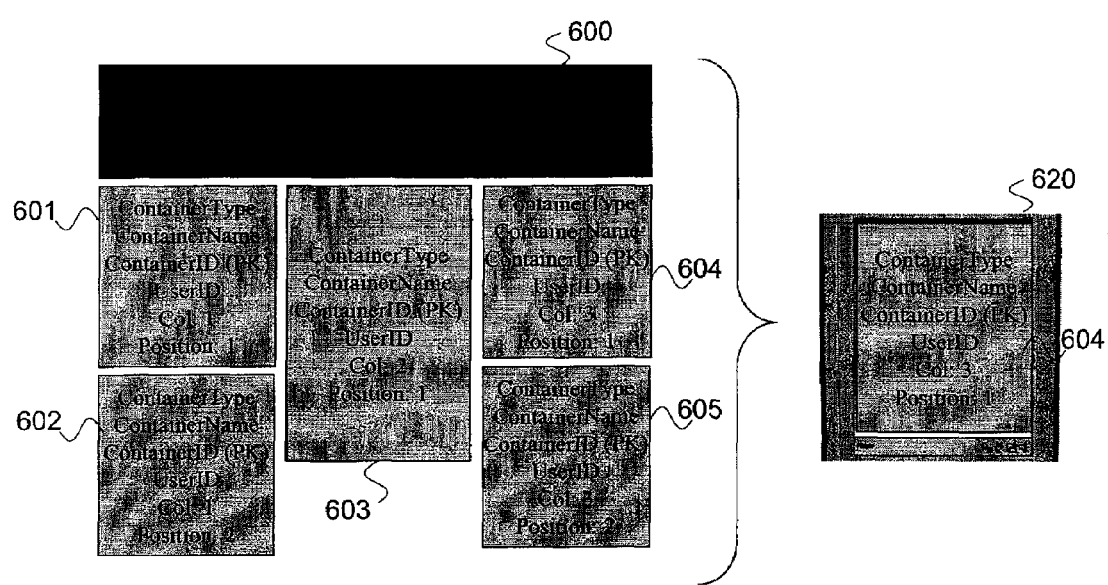
FIG. 6 illustrates alternative screen layouts for a set of applications.

FIG. 6 is an illustration of how the interface pieces operate depending on whether the presentation is on a computer with an Internet browser or on a wireless communication device. Screen image 600 is an exemplary display illustrating how the different applications can be displayed on a computer with an Internet browser. Each application or application component can control a different section of the screen 601-605. For example assume application A controls screen section 604. Output in the form of selected attributes, alerts and triggers from the application will appear in the screen portion 604.

Screen image 620 is an exemplary screen image that is displayed when the same application is displayed on a wireless communication device. As noted above the application output appears as a stand-alone recognizable section occupying a usable portion of the available display.

Thus, when presented on the traditional Internet browser on a PC, each interface piece is "snapped" together in an order defined by the user. When presented on a wireless communication device, each interface piece is shown independently, with the ability to easily cycle through each application as desired.

Returning to FIG. 3, lastly, the system generates any alerts and triggers as determined by applicable thresholds (block 322). The alerts and triggers are determined from the information loaded at block 320. The alerts can take the form of a graphical display, an audible indicator, the vibration of the wireless communication device, an emailed message, or any combination thereof. As those of skill in the art will appreciate, other alert notification mechanisms could be used and are within the scope of the invention.

Figure 7A:
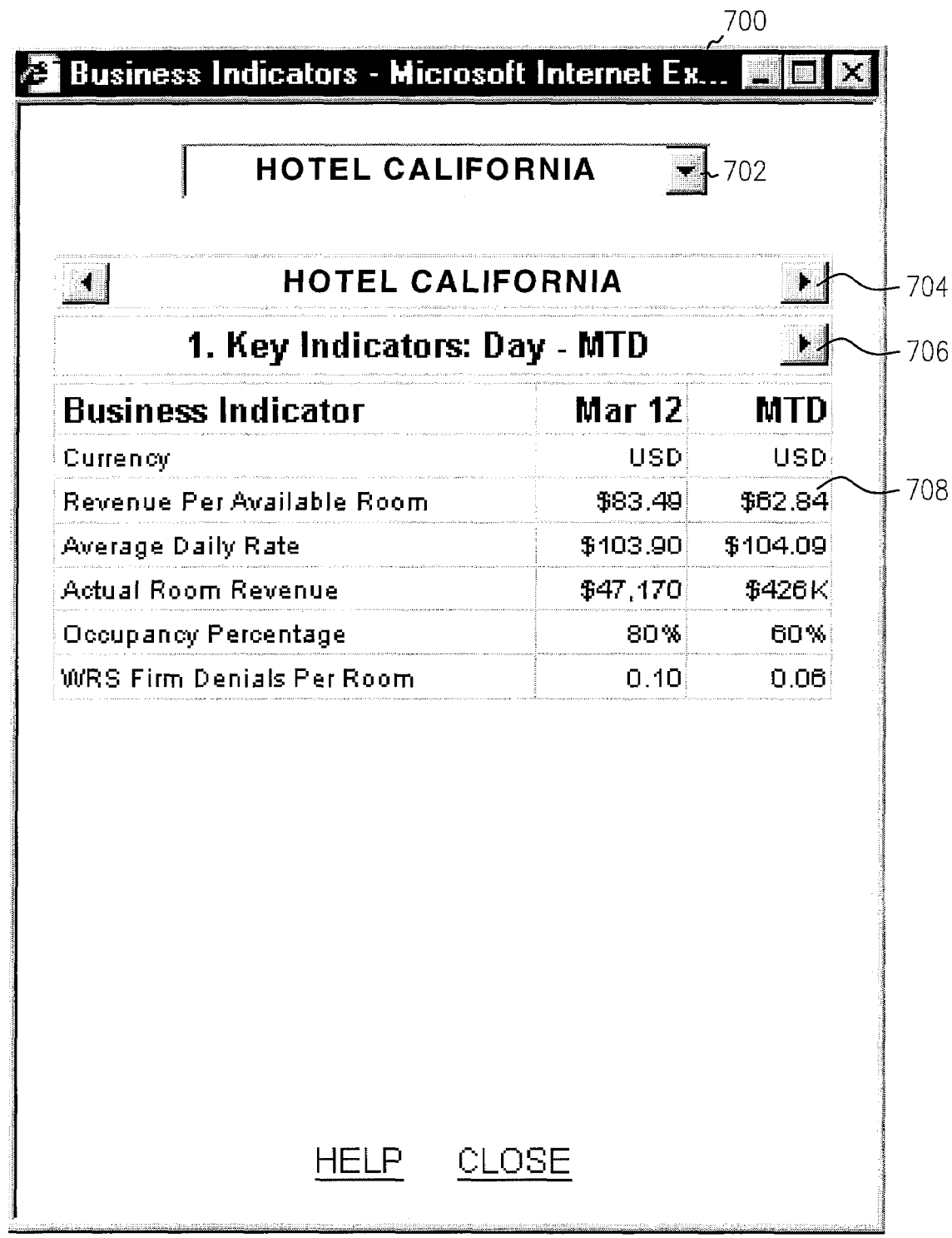

FIGS. 7A-7H illustrate various aspects of a user interface utilized in various embodiments of the invention. The user interface illustrated in FIGS. 7A-7H illustrate a set of panels comprising indicators that have been subscribed to using the system and methods described above. FIG. 7A illustrates an exemplary key indicators panel 700 in accordance with an embodiment of the invention. Panel 700 includes as input elements entity selector 702, scrolling selector 704, and information selector 706. Entity selector 702 provides a mechanism to select a particular entity within a group of entities. In one embodiment, the entities are hotels, and the selector is used to select a particular hotel within a grouping of hotel properties. Groups can be arranged according to region, management responsibility, ownership etc. The invention is not limited to any particular grouping methodology. Scrolling selector 704 provides a mechanism to scroll, or cycle through the group of entities. Scrolling selector 704 provides an interface that can be used to navigate within a group by selecting the previous or next entity within the group. Information selector 706 provides a mechanism for selecting information to be displayed regarding the entity selected via selectors 702 and/or 704. In one embodiment, the domain of information that can be selected comprises subscription-based information (SBI). In the exemplary panel 700, key indicators output 708 is displayed. In this particular embodiment, the key indicators comprise the revenue per available room, the average daily rate, the actual room revenue, the occupancy percentage for the hotel, and the firm denials per room given by reservation services. Alerts can be generated if the values fall below thresholds registered by the user (PTRs).

In some embodiments, a user of the system can scroll through the SBI using selectors 704 and 706. For example, a user can keep information selector 706 constant and scroll through the available hotels by selecting the previous or next interface button in selector 704. With each selection, the data elements are updated to reflect the values for the selected hotel. Alternatively, the user can keep entity selector 704 constant, and scroll through panels comprising available information by selecting the interface button in selector 706. In this case, the output on wireless communication device's screen changes to display panels comprising different data elements. Exemplary panels showing different data elements are presented in FIGS. 7B-7H.

Figure 7B:
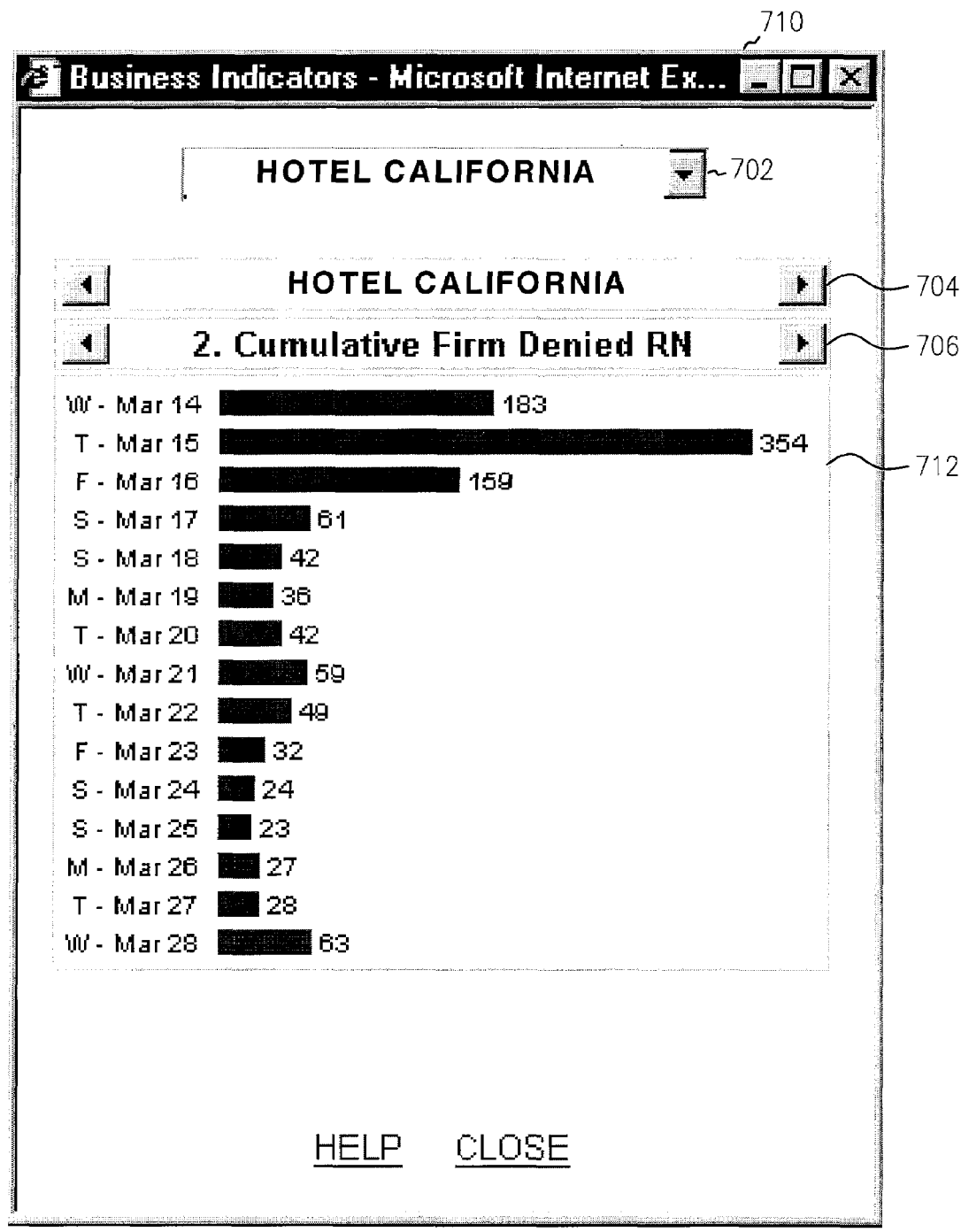

FIG. 7B illustrates an exemplary cumulative firm denials panel 710 for a selected hotel. A firm denial is a denial of a room reservation to a party that requested a room for a particular date or range of dates. Generally, a firm denial is based on lack of rooms due to capacity controls or minimum stay controls. Output data 712 comprises a range of dates and a bar graph of the number of firm denials on each date. In some embodiments, an alert is generated and displayed as a highlighted bar in the bar graph if the number of denials exceeds a registered threshold.

Figure 7C:
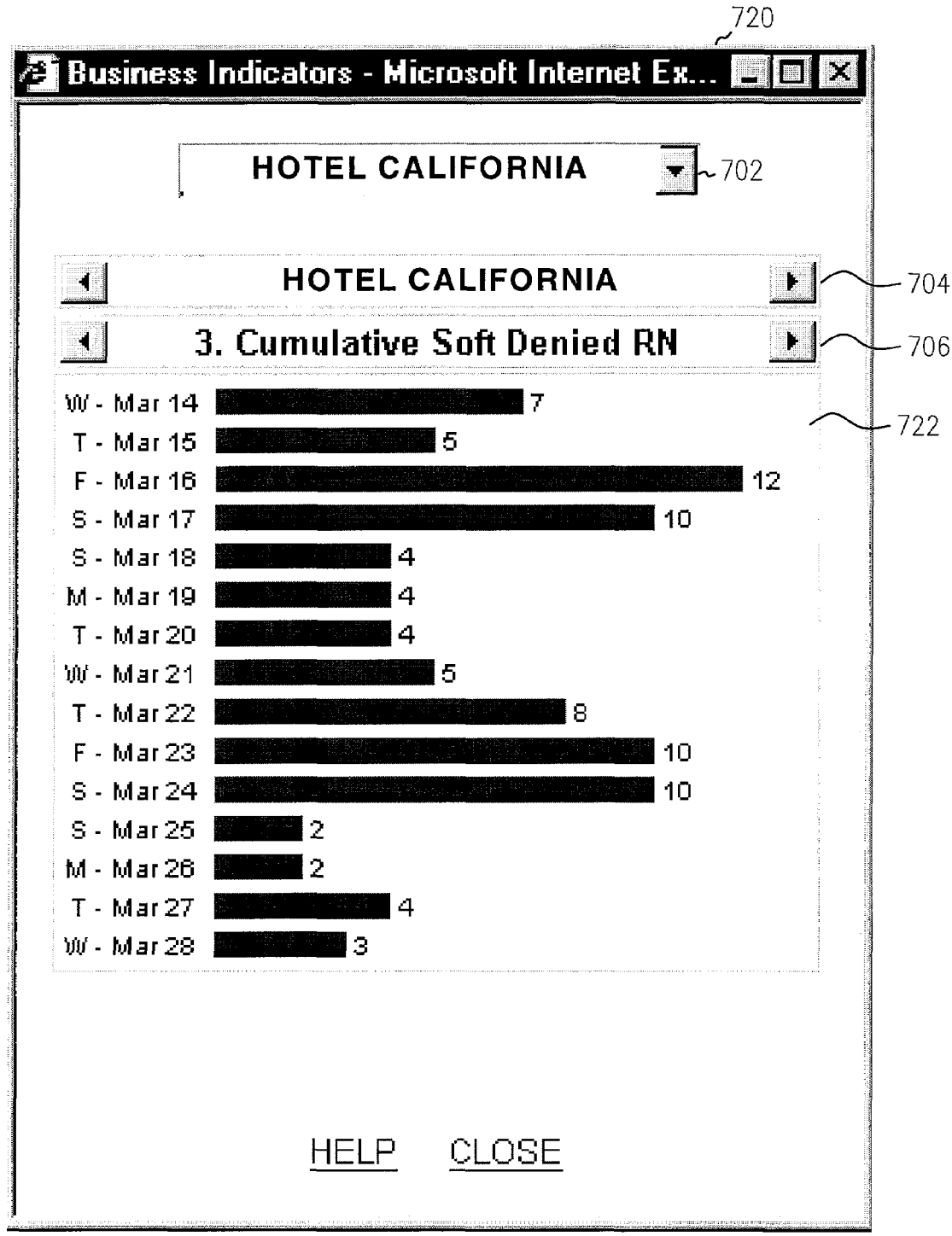

FIG. 7C illustrates an exemplary cumulative soft denial panel 720. Generally, a soft denial is the denial of a room reservation to a party due to rate controls. That is, rooms may be available, but not at the rate requested by the party. Output 722 comprises a range of dates and a bar graph of the associated number of soft denials for that date.

Figure 7E:
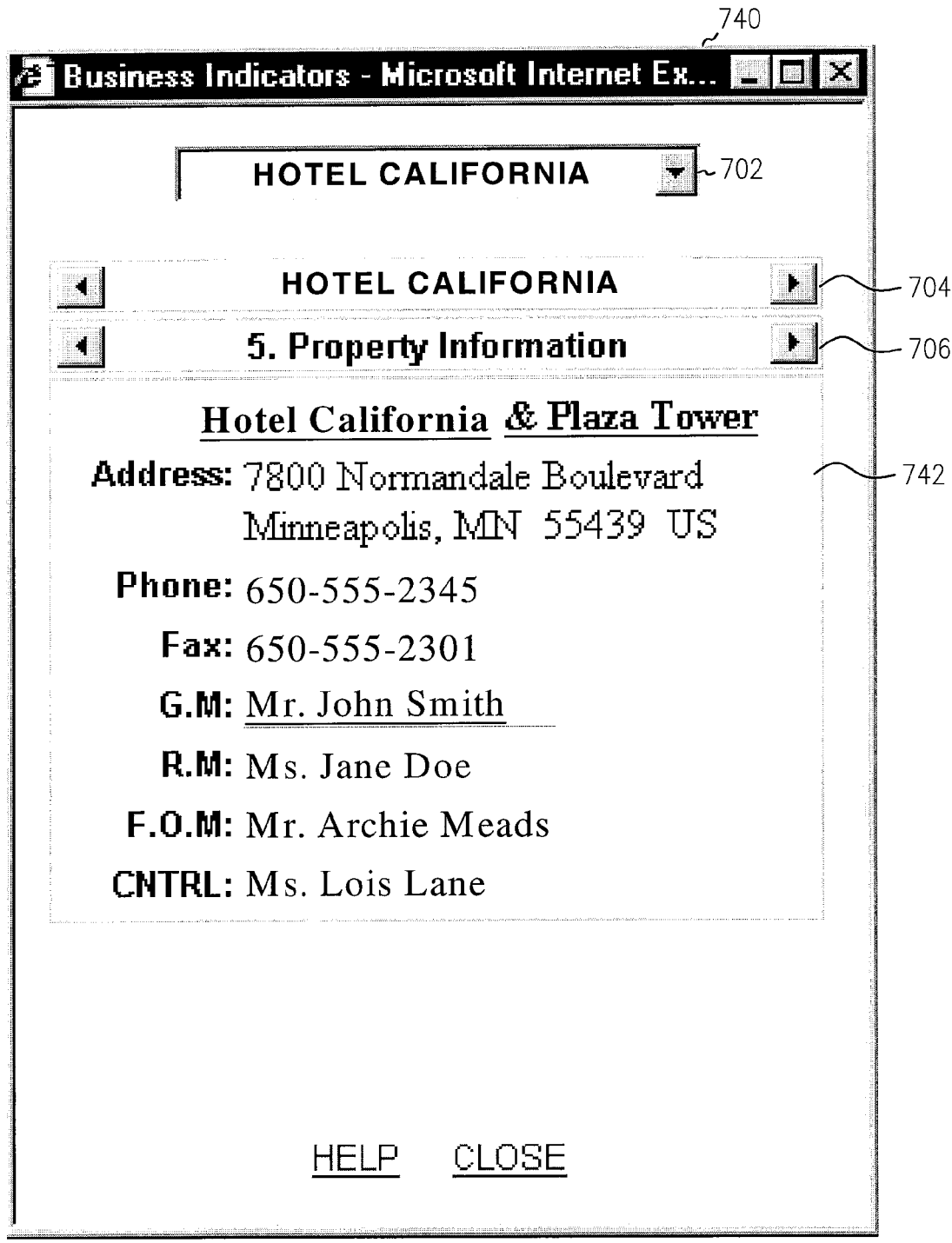

FIG. 7D illustrates an exemplary past firm denial panel 730. In this exemplary panel, the output date 732 comprises a range of dates, the available rooms on that date, the firm denials on that date, and the status. In one embodiment, the status field includes the following values:

MSx—Minimum stay through "x" nights (i.e. MS2 means minimum stay through two nights is required.
GTD—Guaranteed
OPN—Open
NAx—No arrival unless stay "x" number of days
CLS—Closed FIG. 7E illustrates an exemplary property information panel 740. In some embodiments, output 742 comprises name, address and contact information regarding the property. For example, the hotel address, phone number and fax number can be displayed. In addition, key management employees can be displayed. In some embodiments, the key management employees include the general manager, the resident manager, the front office manager, and the controller for the property are displayed. In some embodiments, if an e-mail address is stored by the system, the name of the employee is underlined. In these embodiments, clicking on the underlined name causes an e-mail interface to be started. Other methods of highlighting could be used and are within the scope of the invention.

Figure 7F:
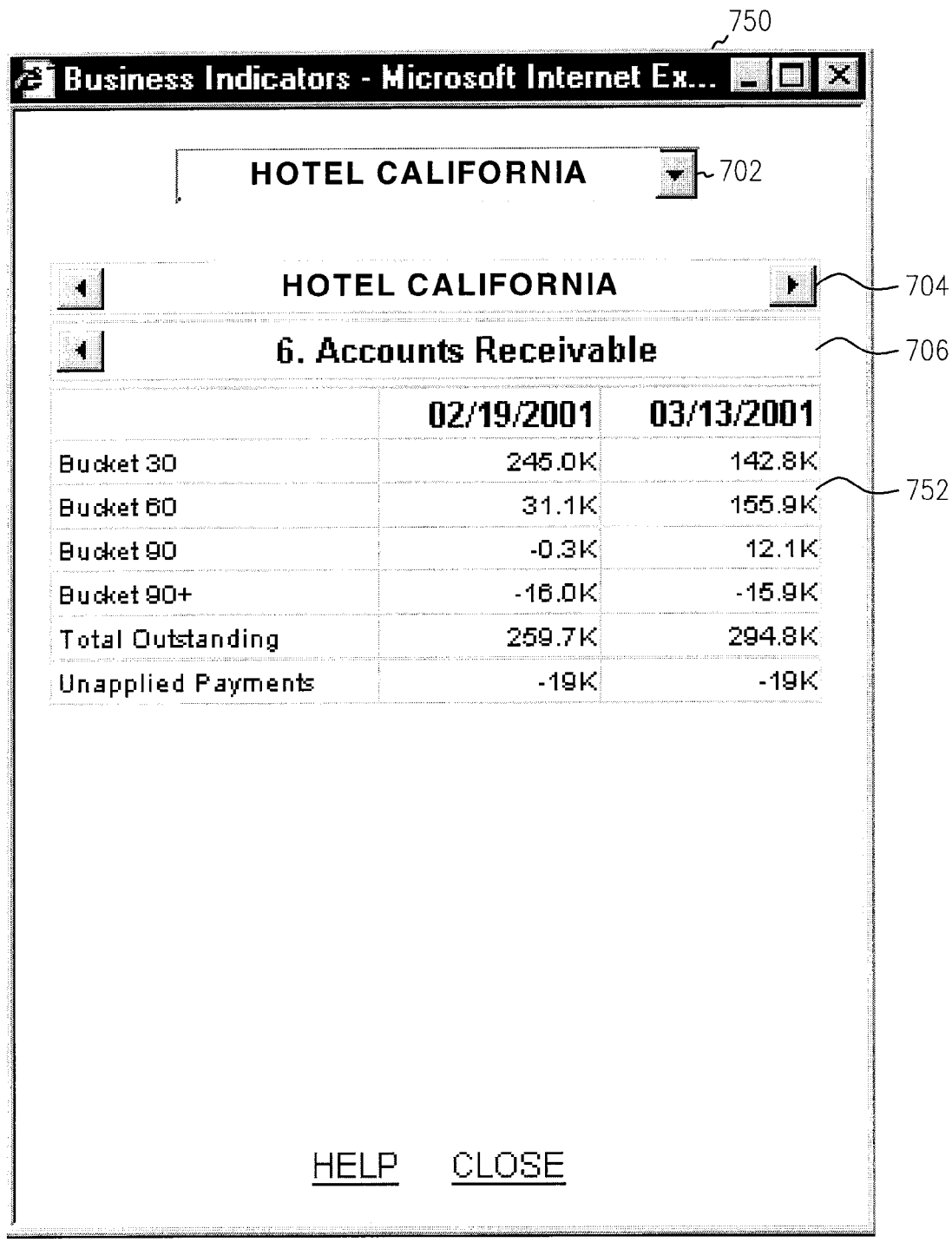

FIG. 7F illustrates an exemplary accounts receivable panel 750 according to an embodiment of the invention. The output data 752 in one embodiment comprises accounts receivable that are due over a 30, 60, 90 and 90+ day period, the total amount due, and unapplied payments received from the selected hotel. If any of the amounts exceed a registered threshold, an alert can be generated.

Figure 7G:
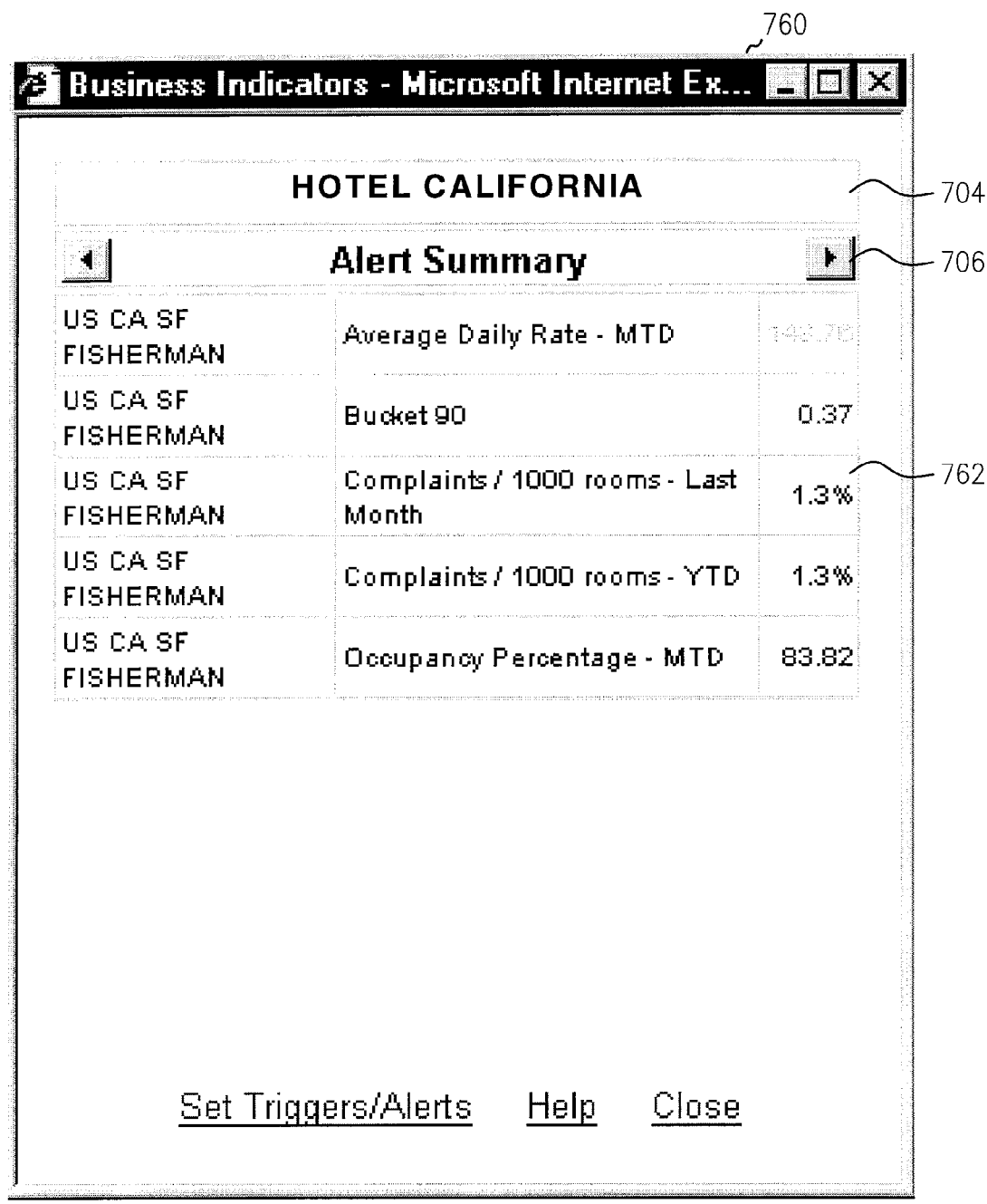

FIG. 7G illustrates an exemplary alerts summary panel 760 according to an embodiment of the invention. The output data 762 in one embodiment comprises a summary of the alerts for all of the indicators that a user has subscribed to, regardless of the source panel. The summary panel 760 thus provides an overview of all indicators for which alerts have been generated, and the user does not need to scroll to each individual panel containing the indicator. In some embodiments, the alert summary can be filtered according to a particular property. In alternative embodiments, the alert summary is presented for all applications, application elements and selected properties.

FIG. 7H illustrates an exemplary e-mail generated by some embodiments of the invention. Similar to the panel in FIG. 7G, the e-mail generated in one embodiment of the invention comprises a summary of all of the alerts that are communicated to the wireless communication device. In one embodiment, particular property, the indicator, the alert value, and the alert type are generated. The alert value in some embodiments is shaded to further indicate the type of alert.

It should be noted that the information displayed in the exemplary panels illustrated in FIGS. 7A-7G, and the exemplary e-mail text illustrated in FIG. 7H can vary depending on how the user has personalized the system through subscription to particular applications and data. Additionally, in some embodiments, if any of the data values exceed a threshold (e.g. a PTR), the system will generate an alert as described above.

Further examples of the types of triggers and alerts that can be displayed using the systems and methods described above will now be described. For convenience, the examples have been grouped into general categories, including revenue optimization, customer service, and performance goals. It should be noted that the groupings are for illustration only, and that the invention is not limited in any way by the groupings.

Revenue Optimization

In some embodiments of the invention, a user can subscribe to applications and data, and register thresholds that contribute to optimizing revenue for a hotel or group of hotels. In these embodiments, the following data elements are included in the set of subscription based information:

Total number of guest rooms in the hotel (A)
Number of rooms open for sale (O)
Number of rooms closed for sale (C)
Filters currently applied to rates (R)
Filter currently applied to stays (S)
Denied room nights to date for a particular date (D)

In some embodiments, the above-described elements are updated on an hour or minute basis. However, the invention is not limited to such an update frequency, and in alternative embodiments, the data elements are updated on a daily basis. In order to minimize usable denied revenue due to reservation denials, one embodiment triggers an alert if C, R, or S are "on" (i.e. the indicated filter is being applied) and if D>5. In addition, the alert can contain the lost revenue associated with the denied revenues due to the denied room nights. In this embodiment, denied room nights for the next 14 days are delivered to and displayed by the system. In an alternative embodiment, denied room nights for any night in which inventory is available are delivered to and displayed by the system.

In further embodiments, the revenue per available room is optimized by enabling a user such as a general manager to monitor historic revenue per available room (RevPAR) with current revenue per available room calculated 60 days prior to arrival based on the occupancy percentage and the average room rate. In some embodiments, an alert is generated if the current RevPAR varies from the historical RevPAR by more than 5%. As those of skill in the art will appreciate from the discussion above, the percentage variance can be personalized.

In a further embodiment, receivables from a hotel are compared to the total annual expected fees and an alert generated if the expected fees exceed a registered percentage of the receivables. In one embodiment, a default percentage of 10% is used as a value to trigger an alert.

In a still further embodiment, actual cash flow can be compared to projected cash flow, and an alert generated if the actual varies from the projected cash flow by more than a threshold amount. The threshold amount can be expressed as actual dollars or as a percentage of the projected amount.

Customer Service

In some embodiments of the invention, the data elements comprising the SBI and registered as thresholds are used to provide improved customer service. For example, in one embodiment, a manager can be alerted to the check-in of a VIP guest. The VIP status can be based on frequent stays, status as an employee of a key account, or because the guest is a local celebrity. In some embodiments, the name, room number and VIP type are delivered and displayed. A status field is also delivered and displayed. The status field can be "Due" meaning the guest is due to arrive, "Meet" meaning the guest should be met and greeted. The status can be changed to "In" after the hotel representative has met and greeted the guest. In some embodiments, the data elements are updated at least hourly. In alternative embodiments, the data elements are updated on a minute-by-minute basis.

In addition to greeting the VIP guest, the system can also include a field to indicate that a gift, such as a fruit basket should be delivered to the VIP guest, and the time that the gift should be delivered can be forwarded to the wireless communication device. The delivery time can be based determined as a threshold amount of time after the VIP guest has checked in, or has been greeted by hotel management (i.e. the status "In" described above).

In further embodiments, the data elements delivered and displayed by the system can be used to ensure that hotel guests receive timely service. In one embodiment, room service call time data is compared to the current time to ensure that guests receive their order within a registered threshold time period. An alert is generated if the threshold is exceeded. Similarly, in an alternative embodiment, the time that a guest arranges for a chauffeur is subscribed to and delivered to a wireless communication device. An alert is generated to the wireless communication device of the present invention that is carried by the assigned chauffeur. The alert is generated at a threshold time before the arranged pick-up time. The customer name and room number is displayed on the device.

A further alternative embodiment generates an alert to a front office manager when the number of customers waiting for their room to become available exceeds a registered threshold amount. The check-in status data element described above can be used to track customers waiting for a room. For example, if a customer has a check-in status of "In", but does not have an assigned room, the customer is waiting for a room to become available. In one embodiment, if more than ten customers are waiting for a room, the front office manager is alerted via the wireless communication device of the present invention.

In a still further embodiment, hotel supplies can be tracked and an alert generated on wireless communication devices carried by hotel management when supplies are low, i.e. they fall below a registered threshold amount. For example, data elements representing the beverage name, current quantity on hand and the order arrival date can be tracked. In one embodiment, if it is more than one day prior to the expected order arrival date and the quantity on hand is below a registered threshold, an alert is generated.

In yet another embodiment, sales representatives of a hotel property can subscribe to data elements that provide the following data:

Total number of guest rooms in the hotel (A)
Current actual occupancy percentage (%)
Current unsold group allocation of rooms (GA)
Group average rate goal (G$)
Forecasted occupancy (FO)

The above data can be delivered and displayed to the wireless communication device of the present invention carried by the sales representative. The sales representative can use the data in order to discuss rates and availability with a potential customer at the customer's site.

In a still further embodiment, a user such as a hotel manager is alerted when parties with non-guaranteed reservations have not yet checked in past a predetermined (and potentially user-defined) time. In some embodiments, the following elements are used:

Reservation type field (A)
Checked-in status (B)
Defined system time when non-guaranteed reservations should be canceled (C)

The system, at predetermined or use-defined time C, searches a reservations database for reservations where type field A is a non-guaranteed type, and where check-in status B is "not checked in". If any such reservations exist, an alert is generated on the wireless communication device.

Performance Goals

In some embodiments of the invention, the data elements comprising the SBI and registered as thresholds are used to ensure that corporate or hotel goals are being met. For example, in one embodiment, data elements for year-to-date revenue and incentive plan goal revenue are compared. If the year-to-date revenue is below the incentive plan goal, an alert is generated.

In an alternative embodiment, data elements for hotel success measures are compared with data elements containing goal values. If month-to-date or year-to-date values are below goal values, an alert is generated. In one embodiment, the following data elements can be subscribed to and PTRs registered:

Operating Income Before Taxes (OIBT)
Room Sales Index (an index indicating market share)
Income after Capital Charge (ICC)
Initial fees
Number of hotels opened
Number of hotels closed
Receivables over 90 days
Revenue per available room growth
Contribution to revenue
Willingness to return
Employee turnover
Gallop score Similarly, data elements relevant to a particular hotel can be subscribed to and compared to goal values. In one embodiment, these data values include:
Average daily room rate
Customer satisfaction index
Room sales index
Willingness to return
Complaints per 1000 rooms
Revenue per available room In a further alternative embodiment, the "Channel Mix" of reservations (i.e. the source of the reservation) can be subscribed to and tracked. Typically the reservation sources include voice (i.e. phone reservations), web (world-wide-web site reservations), and reservations made over a GDS (Global Distribution System, a travel reservation system such as Sabre or Apollo). In some embodiments, thresholds can be registered on the number of reservations from a particular source, and an alert generated if the number falls below the registered amount.

In a still further embodiment, a user can subscribe to data related to a hotel opening project. Data elements representing milestones are tracked, and if a milestone is missed, an alert can be generated.

CONCLUSION

Systems and methods for providing dynamic display of business information on a portable wireless communication device are disclosed. The business information can include triggers and alerts that have been personally defined and subscribed to by a user. Although specific embodiments have been illustrated and described herein, it will be appreciated by those of ordinary skill in the art that any arrangement that is calculated to achieve the same purpose may be substituted for the specific embodiments shown. For example, the embodiments of the invention have been described in the context of a hotel environment. However, the teachings of the specification can be applied to other environments, such as cruise ship environment, or other business environments. This application is intended to cover any adaptations or variations of the present invention.

The embodiments of the invention provide advantages not found in previous systems. For example, the systems and methods of the invention provide a mechanism for a user to selectively receive dynamic business information on a subscription basis (i.e. SBI). The business information can have associated thresholds (i.e. PTR) which, when crossed, generate event based triggers or alerts. This provides a user the ability to receive graphical views of key business data whenever and wherever the user desires. Such information includes customer satisfaction trends, revenue management information, customer service information, and productivity information. The user need not be near a workstation, or wait to receive printed information; all that is required is the ability to connect to a network.

The terminology used in this application is meant to include all of these environments. It is to be understood that the above description is intended to be illustrative, and not restrictive. Many other embodiments will be apparent to those of skill in the art upon reviewing the above description. Therefore, it is manifestly intended that this invention be limited only by the following claims and equivalents thereof.

We claim:

1. A computerized method for delivering information on a wireless communication device, the method comprising:
receiving by the wireless communication device a set of data, said data including one or more data elements;
comparing a data element from the one or more data elements to a threshold value; and
generating an alert when the data element crosses the threshold value;
wherein the set of data includes rooms available to sell, a reservation status, and denied reservations and wherein an alert is generated when the denied reservations exceed a predetermined or user-defined number.

2. The method of claim 1 further comprising subscribing to the set of data.

3. The method of claim 1, further comprising subscribing to an application maintaining the set of data.

4. The method of claim 1, further comprising setting the threshold value.

5. The method of claim 1, wherein generating an alert comprises displaying a graphical indication of the alert.

6. The method of claim 1, wherein generating an alert comprises providing an audible tone.

7. The method of claim 1, wherein generating an alert comprises initiating a vibration device on the wireless communication device.

8. The method of claim 1, wherein generating an alert comprises sending an email.

9. A computer-readable medium having computer executable instructions for performing a method for delivering information on a wireless communication device, the method comprising:
receiving by the wireless communication device a set of data, said data including one or more data elements;
comparing a data element from the one or more data elements to a threshold value; and
generating an alert when the data element crosses the threshold value;
wherein the set of data includes room availability data and room rate data and further comprising updating the set of data on the wireless communication device on an at least daily basis.

10. The computer-readable medium of claim 9, further comprising subscribing to the set of data.

11. The computer-readable medium of claim 9, further comprising subscribing to an application maintaining the set of data.

12. The computer-readable medium of claim 9, further comprising setting the threshold value.

13. The computer-readable medium of claim 9, wherein generating an alert comprises displaying a graphical indication of the alert.

14. The computer-readable medium of claim 9, wherein generating an alert comprises providing an audible tone.

15. The computer-readable medium of claim 9, wherein generating an alert comprises initiating a vibration device on the wireless communication device.

16. The computer-readable medium of claim 9, wherein generating an alert comprises sending an email.

17. A computerized method for delivering information on a wireless communication device, the method comprising:
receiving by the wireless communication device a set of data, said data including one or more data elements;
comparing a data element from the one or more data elements to a threshold value; and
generating an alert when the data element crosses the threshold value;

wherein the set of data includes guest check-in data and guest type data and wherein an alert is generated upon the check-in of a guest having a predetermined or user-defined type.

18. A computerized method for delivering information on a wireless communication device, the method comprising:
receiving by the wireless communication device a set of data, said data including one or more data elements;
comparing a data element from the one or more data elements to a threshold value; and
generating an alert when the data element crosses the threshold value;
wherein the set of data includes room availability data and room rate data and further comprising updating the set of data on the wireless communication device on an at least daily basis.

19. A computerized method for delivering information on a wireless communication device the method comprising:
receiving by the wireless communication device a set of data, said data including one or more data elements;
comparing a data element from the one or more data elements to a threshold value; and
generating an alert when the data element crosses the threshold value;
wherein the set of data includes current revenue per available room and historical revenue per available room and wherein an alert is generated when the variance between the historical revenue per available room and the current available room exceeds a predetermined or user-defined amount.

20. A computerized method for delivering information on a wireless communication device, the method comprising:
receiving by the wireless communication device a set of data, said data including one or more data elements;
comparing a data element from the one or more data elements to a threshold value; and
generating an alert when the data element crosses the threshold value;
wherein the set of data includes room availability data, revenue per available room, and average daily rate.

21. A computerized method for delivering information on a wireless communication device, the method comprising:
receiving by the wireless communication device a set of data, said data including one or more data elements;
comparing a data element from the one or more data elements to a threshold value; and
generating an alert when the data element crosses the threshold value;
wherein the set of data includes hotel address data and key hotel personnel data.

22. A computerized method for delivering information on a wireless communication device, the method comprising:
receiving by the wireless communication device a set of data, said data including one or more data elements;
comparing a data element from the one or more data elements to a threshold value; and
generating an alert when the data element crosses the threshold value;
wherein the set of data includes receivables data and wherein an alert is generated when a receivables balance exceeds a predetermined or user-defined age.

23. A computerized method for delivering information on a wireless communication device, the method comprising:
receiving by the wireless communication device a set of data, said data including one or more data elements;
comparing a data element from the one or more data elements to a threshold value; and
generating an alert when the data element crosses the threshold value;
wherein the set of data includes supplies data and wherein an alert is generated when a hotel supply is below a predetermined or user-defined quantity.

24. A computerized method for delivering information on a wireless communication device, the method comprising:
receiving by the wireless communication device a set of data, said data including one or more data elements;
comparing a data element from the one or more data elements to a threshold value; and
generating an alert when the data element crosses the threshold value;
wherein the set of data includes service provisioning data and wherein an alert is generated when a current time is greater than a service provisioning time.

25. The method of claim 24, wherein the service provisioning data is room service data.

26. The method of claim 24, wherein the service provisioning data is chauffeur schedule data.

27. The method of claim 24, wherein the service provisioning data is room availability data.

28. A computerized method for delivering information on a wireless communication device, the method comprising:
receiving by the wireless communication device a set of data, said data including one or more data elements;
comparing a data element from the one or more data elements to a threshold value; and
generating an alert when the data element crosses the threshold value;
wherein the set of data includes guest check-in data and reservation type data and wherein an alert is generated upon detecting a guest having a predetermined or user-defined reservation type has not checked in by a predetermined or use-defined time.

* * * * *